Nov. 6, 1956    J. O. FORSTER    2,769,229
TOOL FOR EXTRACTING WIRE COIL INSERTS
Filed Feb. 12, 1954

INVENTOR.
John O. Forster
BY
ATTORNEY

United States Patent Office 2,769,229
Patented Nov. 6, 1956

2,769,229

TOOL FOR EXTRACTING WIRE COIL INSERTS

John O. Forster, Harrison, N. Y., assignor to Heli-Coil Corporation, Danbury, Conn., a corporation of Delaware Application February 12, 1954, Serial No. 409,930

3 Claims. (Cl. 29—240.5)

The invention relates to a tool for extracting wire coil screw thread inserts, and particularly to a tool which may be power driven for the indicated purpose.

Removing a wire coil from a tapped hole in which the coil forms a high strength screw thread lining is a troublesome job and in practically all instances involves the destruction of the insert. Furthermore, as far as I know, no tool for removing an insert has as yet been developed which may be power driven whereby the time of operation can be shortened in comparison to a manually operated tool and whereby the insert will not be distorted, or twisted or damaged beyond reuse. Now, I have found that the problem of making a tool for the indicated purpose can be simplified if the tool is intended for use only with an insert coil which is so assembled in the threaded hole of a work-piece, that it protrudes for not less than about one convolution above the surface of the work-piece.

There are certain structures where indeed it is desirable that the trailing convolution of a wire coil screw thread insert protrudes in such a manner. In other cases, where the coil must be fully embedded, it is possible to pry the top end of a wire coil insert out of the first thread of the tapped hole of the work-piece in preparation for the application of a power extracting tool.

The invention therefore aims to provide a tool adapted for power drive for extracting a wire coil screw thread insert which projects with approximately one convolution or more from the threaded hole lined by the coil.

The invention also aims to provide a power-driven tool including means for progressively urging the insert coil out of its seat in the threaded hole and to receive it between a plurality of elements in which the received coil portions can expand.

Another object of the invention is the provision of a tool of the mentioned type and for the indicated purpose whereby a wire coil screw thread insert projecting from a work-piece as stated hereinbefore can be removed without any friction between the insert and the tapped hole of the work-piece.

Figure 3:
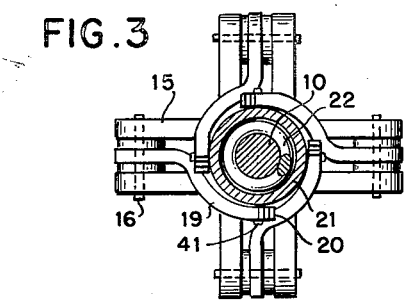
Figure 4:
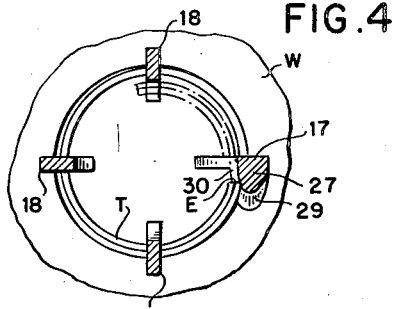
Figures 2, 5:
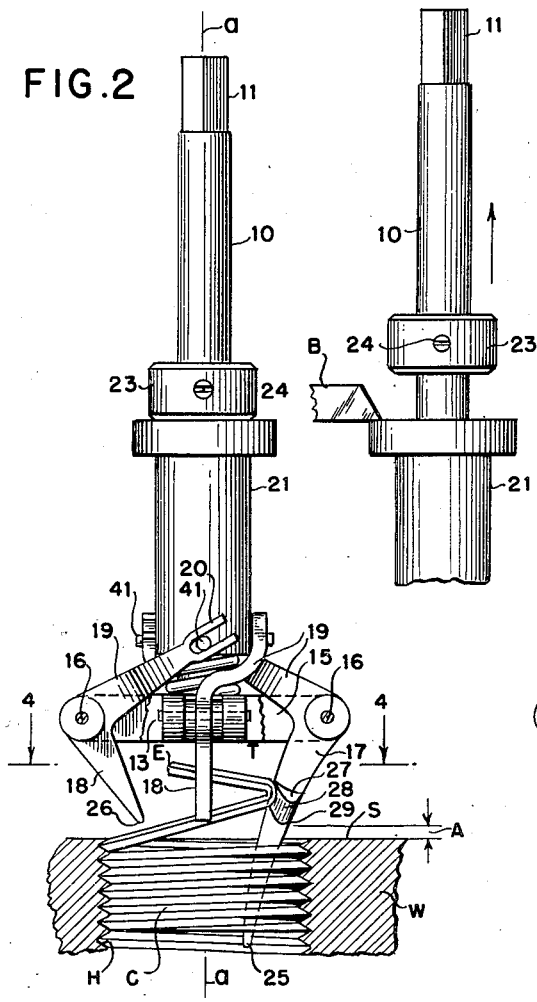
Figure 1:
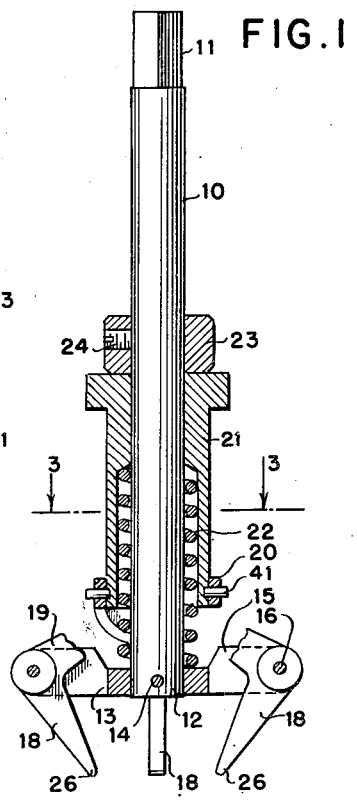

Further objects and details of the invention will be apparent from the description given hereinafter and the accompanying drawing illustrating an embodiment thereof by way of example. In the drawing Fig. 1 is a longitudinal section of a tool according to the invention, Fig. 2 is a side-elevation of the tool applied to an insert coil, Fig. 3 is a cross-section along line 3—3 of Fig. 1, Fig. 4 is a cross-section along line 4—4 of Fig. 2, and Fig. 5 is a partial side-view of the tool in a position to release an extracted insert coil.

Referring now to the drawing, the tool comprises a drive shaft 10 to which a torque may be applied and which for this purpose may have a square upper end 11 whereby the shaft may be rotated either by a wrench applied to the head for manual operation, or by a prime mover to which the head 11 may be attached. To the lower shaft end 12 a spider 13 is secured e. g. by means of a pin 14. On the outer ends of the spider arms 15, claws are journaled on pins 16. There may be three or any suitable and desired higher number of claws which are alike except for one claw 17. The other claws being denoted by 18. Each claw is integral with a cranked lever arm 19 engaging with its forked end 20, a pin 41 which is secured to a bushing 21. This bushing is axially shiftable on the shaft 10 above the spider 13. A compression spring 22 located between the spider and the bushing 21 urges the latter against a collar 23 which can be adjustably secured to shaft 10 by means of a set screw 24. In this topmost position all the claws 17 and 18 are downwardly inclined so that their lower ends 25 and 26 respectively are located on the ends of radii with respect to the axis $a$—$a$ of the tool, which radii are smaller than the inner radius of an insert C in Fig. 2, for which the tool is destined. Thus the claws form an open cage which is narrower at the bottom than near the top substantially where the section of Fig. 4 is taken. The claw 17, which is of special shape, is considerably larger than the claws 18 so that it projects in Fig. 2 deep into the coil C which is inserted in a threaded hole H of a work-piece W, when the ends 26 of the other claws 18 are located slightly above the top surface S of piece W. Approximately, on the level of the ends 26 of claws 18, the claw 17 is provided with a laterally extending finger 27 the inner face 28 of which is so curved that the free end 29 is on a radius larger than the outer radius of the coil C whereas the root 30 is on a radius smaller than the inner radius of the threaded hole H.

In using the tool it will be brought into a position co-axial with the insert coil C which is to be removed and which, as stated hereinbefore, projects with at least one top convolution T from the surface S of the work-piece W. While the tool is rotated in the same direction as the coil is wound, it is also lowered so far that ends 26 of claws 18 and finger 27 are only a slight distance A above the surface S whereas the end 25 of a claw 17 reaches deep into the coil C. While thus the claws 18 and the finger 27 approach the surface S, the finger 27, since it faces the direction of rotation of the tool and has its inner surface extending obliquely across the path in which the claws travel, will engage the ultimate end E of the projecting convolution T from the outside as shown in Fig. 4 in solid lines and urge that end inside of claws 17 and as the rotation continues, also inside of the other claws 18 as shown in Fig. 2 and in Fig. 4 in dash lines. The projecting portion of the coil will then be held between the claws. While the rotation of the tool continues, the claw 17 without touching the work-piece, will remove the coil by slowly turning in its direction until the complete coil has been removed. As during the rotation the finger 27 causes a contraction of the engaged coil portion, the latter will have the tendency to expand. This tendency will move the coil upward within the range of the claws 18 as the uppermost part of the cage formed by the claws represents the largest space for the coil to expand. When this operation is finished the coil will be seated completely in that cage, and the extracting tool can then be removed from the work-piece.

In order to release the coil when the tool is manually operated, it is merely necessary to push the bushing downward relatively to the spider 13. Thereby, the levers 19 of the claws will be turned downward and the claws outward about the journals 16, so that the coil held between the claws can drop down. If the tool is power driven, it can be raised axially upward until the bushing bears against an abutment B provided for this purpose on a stationary part of the prime mover (not shown). When the upward movement continues the shaft 10 with spider 13 will be raised in relation to the bushing 21 so that the claws are turned outward as hereinbefore described.

As stated above the tool according to the invention requires that approximately one convolution of an inserted coil projects from the surface of the work-piece. Where originally a coil is inserted completely below the surface of the work-piece, the coil may be first screwed out sufficiently by means of a conventional extracting tool whereupon the much faster working tool according to the invention may be applied to accomplish the removal of the coil.

It will be apparent to those skilled in the art that many alterations and modifications of the structure illustrated and described can be made without departure from the essence and spirit of the invention which for that reason shall not be limited but by the scope of the appended claims.

I claim:

1. A tool of the class described comprising a rotatable shaft, a plurality of members spaced circumferentially of the shaft and connected to the shaft for rotation therewith, portions at least of said members extending longitudinally of the shaft and converging in the direction of the axis of rotation thereof to form a cage-like structure tapering axially of and rotating with the shaft, and a lateral extension formed on one of the members having an inner work engaging surface forming an acute angle with a radial line of the circle circumscribed by the members revolving in operative direction about the axis of the shaft, said acute angle opening towards the inside of said circle, thus to engage from the outside a convolution of a coil projecting from a work-piece in which said coil is inserted, and to urge said convolution inwards of said structure upon rotating of the shaft coaxially with the coil.

2. A tool of the class described comprising a rotatable shaft, a plurality of members spaced circumferentially of the shaft and connected to one end of the shaft for rotation therewith, portions at least of said members extending longitudinally of the shaft beyond said end thereof and being inclined in respect to the axis of rotation of the shaft, said portions converging in the direction of said axis to form a cage-like structure tapering axially of and rotating with the shaft beyond said end thereof, and a lateral extension formed on one of said portions intermediate the ends thereof, said extension having an inner work engaging surface forming an acute angle with a radial line of the circle circumscribed by the members revolving in operative direction about the axis of the shaft, said acute angle opening towards the inside of said circle, thus to engage from the outside a convolution of a coil projecting from a work-piece in which said coil in inserted, and to urge said convolution inwards of said structure upon rotation of the shaft coaxially with the coil.

3. A tool of the class described comprising a rotatable shaft, a plurality of members spaced circumferentially of the shaft and connected to one end of the shaft for rotation therewith, portions at least of said members extending longitudinally of the shaft beyond said end thereof and being inclined in respect to the axis of rotation of the shaft, said portions converging in the direction of said axis to form a cage-like structure tapering axially of and rotating with the shaft beyond said end thereof, one of said portions being substantially greater in length than the other portions, and a lateral extension formed on said one portion adjacent the smaller end of said structure, said extension having an inner work engaging surface forming an acute angle with a radial line of the circle circumscribed by the members revolving in operative direction about the axis of the shaft, said acute angle opening towards the inside of said circle, thus to engage from the outside a convolution of a coil projecting from a work-piece in which said coil is inserted, and to urge said convolution inwards of said structure upon rotation of the shaft coaxially with the coil.

References Cited in the file of this patent

UNITED STATES PATENTS

| | | |
|---|---|---|
| 737,873 | Schlosser | Sept. 1, 1903 |
| 1,341,888 | Doyle | June 1, 1920 |
| 1,813,695 | Brockschmidt | July 7, 1931 |
| 2,397,513 | Smith | Apr. 2, 1946 |